US012663250B2

(12) United States Patent
Crandell

(10) Patent No.: US 12,663,250 B2
(45) Date of Patent: Jun. 23, 2026

(54) EVIDENCE STORAGE SYSTEM

(71) Applicant: Christopher James Crandell,
Plymouth, CA (US)

(72) Inventor: Christopher James Crandell,
Plymouth, CA (US)

( * ) Notice: Subject to any disclaimer, the term of this
patent is extended or adjusted under 35
U.S.C. 154(b) by 368 days.

(21) Appl. No.: 18/368,295

(22) Filed: Sep. 14, 2023

(65) Prior Publication Data

US 2025/0093140 A1      Mar. 20, 2025

(51) Int. Cl.
 *G01B 3/04*      (2006.01)
 *G09F 23/00*      (2006.01)
 *B65D 63/10*      (2006.01)

(52) U.S. Cl.
 CPC .............. *G01B 3/04* (2013.01); *G09F 23/00*
  (2013.01); *B65D 63/10* (2013.01); *G09F*
  *2023/0025* (2013.01)

(58) Field of Classification Search
 CPC ..................................... G01B 3/04; G01B 3/06
 USPC ................................. 33/1 BB, 485, 494, 759
 See application file for complete search history.

(56) References Cited

U.S. PATENT DOCUMENTS

| | | | | |
|---|---|---|---|---|
| 2,140,914 A | * | 12/1938 | Kothny ................. | E21B 47/022 |
| | | | | 33/494 |
| 4,541,190 A | * | 9/1985 | Weiner ...................... | G09F 7/00 |
| | | | | 40/124.15 |
| 4,805,468 A | * | 2/1989 | Choudhry .............. | G01N 33/36 |
| | | | | 26/70 |
| 5,025,920 A | * | 6/1991 | Walsh ........................ | B01L 1/52 |
| | | | | 206/456 |
| 5,787,616 A | * | 8/1998 | Rogers ...................... | G09F 1/06 |
| | | | | 283/117 |
| 5,913,585 A | * | 6/1999 | Pelland .................. | B42D 15/00 |
| | | | | 33/1 BB |
| 5,915,852 A | * | 6/1999 | Rogers ...................... | G09F 1/06 |
| | | | | 283/117 |
| 6,219,930 B1 | * | 4/2001 | Reid ........................ | G06Q 40/02 |
| | | | | 33/1 BB |
| 6,243,958 B1 | * | 6/2001 | Ringley, Jr. ......... | G09F 15/0056 |
| | | | | 33/474 |
| 6,341,429 B1 | * | 1/2002 | Herskovitz ............ | A61B 5/444 |
| | | | | 33/1 BB |
| 8,166,663 B2 | * | 5/2012 | Elias ...................... | G01B 3/004 |
| | | | | 33/429 |
| 8,276,287 B2 | * | 10/2012 | Estocado ............... | A61B 5/444 |
| | | | | 33/1 BB |

(Continued)

FOREIGN PATENT DOCUMENTS

GB            2569379            6/2019

*Primary Examiner* — George B Bennett

(57)      ABSTRACT

An evidence storage system for measuring, labeling, and
storing evidence gathered at a crime scene includes a box
having a base wall and a peripheral wall. The peripheral wall
is attached to and extends upwardly from the base wall. The
peripheral wall bounds an interior area of the box. The
peripheral wall has an upper edge defining an opening into
the interior area. A lid is positioned on the box abutting the
upper edge to selectively close the opening. A ruler indicium
is printed on an upper surface of the base wall to facilitate
a measurement of an object being positioned on the base
wall. Embodiments may further include tethers and one or
more bags for securing the object within the box while
minimizing the risk of contamination.

13 Claims, 9 Drawing Sheets

(56)        References Cited

U.S. PATENT DOCUMENTS

| | | | | |
|---|---|---|---|---|
| 8,438,744 | B1 * | 5/2013 | Mann ..................... | G09B 19/02 |
| | | | | 33/DIG. 1 |
| 8,505,209 | B2 * | 8/2013 | Estocado ............. | A61B 5/0077 |
| | | | | 33/1 BB |
| 8,823,549 | B1 * | 9/2014 | Moone .................... | G08G 1/01 |
| | | | | 116/63 P |
| 9,161,716 | B2 * | 10/2015 | Estocado ............. | A61B 5/0077 |
| 10,410,546 | B2 | 9/2019 | Vandergriff | |
| D929,219 | S | 8/2021 | Brown | |
| 11,810,481 | B2 * | 11/2023 | Gerace ..................... | G09F 3/06 |
| 12,238,256 | B1 * | 2/2025 | James, Jr. ............. | A61B 5/743 |
| 2008/0181538 | A1 * | 7/2008 | Shaw .................... | B65D 33/34 |
| | | | | 383/34 |
| 2008/0314966 | A1 | 12/2008 | Elston | |
| 2012/0311879 | A1 * | 12/2012 | Mesesan ................. | G01B 3/06 |
| | | | | 33/415 |
| 2016/0245634 | A1 * | 8/2016 | Burns ................... | G01B 3/004 |
| 2021/0372837 | A1 * | 12/2021 | Alcorn ................... | G01F 1/668 |
| 2022/0139267 | A1 | 5/2022 | Gerace | |
| 2025/0142044 | A1 * | 5/2025 | Chen ................... | H04N 13/189 |

* cited by examiner

10

54

46

20

44

52

52

54

EVIDENCE

— 44

| ☐ EVIDENCE | ☐ FOUND PROPERTY | ☐ SEIZED BY SEARCH WARRANT |
|---|---|---|

INSTITUTION:

| CASE NO.: | EVIDENCE NO.: |
|---|---|
| DATE OF COLLCTION: | TIME OF COLLECTION: |

COLLECTED BY:

ITEM DESCRIPTION:

LOCATION OF COLLECTION:

| SUSPECT/S: | |
|---|---|
| | OFFESNSE: |

CHAIN OF CUSTODY

| RECEIVED FROM: | RECEIVED BY: | |
|---|---|---|
| DATE: | TIME: | AM/PM |
| RECEIVED FROM: | RECEIVED BY: | |
| DATE: | TIME: | AM/PM |
| RECEIVED FROM: | RECEIVED BY: | |
| DATE: | TIME: | AM/PM |
| RECEIVED FROM: | RECEIVED BY: | |
| DATE: | TIME: | AM/PM |
| RECEIVED FROM: | RECEIVED BY: | |
| DATE: | TIME: | AM/PM |
| RECEIVED FROM: | RECEIVED BY: | |
| DATE: | TIME: | AM/PM |

EVIDENCE STORAGE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to evidence storage containers and more particularly pertains to a new evidence storage container for measuring, labeling, and storing evidence gathered at a scene.

(2) Description of Related Art Including Information Disclosed Under 37 CFR 1.97 and 1.98

The prior art relates to evidence storage containers. Some prior art references disclose marking systems for marking evidence at a crime scene. For example, the prior art discloses numbered stands or placards that can be positioned next to evidence when marking the evidence at the scene. Other prior art references disclose systems and kits for storing evidence that is collected from the scene. Examples include storage boxes, storage bags, and evidence slides. Some of the storage boxes include a plurality of compartments, while others include filters or ventilation openings minimize contamination of the evidence. However, there is a need in the art for a storage system that can be used to determine a measurement of an evidentiary object, or of a particular feature or element on the object. There is also a need for an evidentiary collection and storage system that can provide a visual scale when taking photos of the evidence while minimizing the risk of cross-contamination that may occur while measuring or photographing the evidence.

BRIEF SUMMARY OF THE INVENTION

An embodiment of the disclosure meets the needs presented above by generally comprising a box having a base wall and a peripheral wall. The peripheral wall is attached to and extends upwardly from the base wall. The peripheral wall bounds an interior area of the box. The peripheral wall has an upper edge defining an opening into the interior area. A lid is positioned on the box abutting the upper edge to selectively close the opening. A ruler indicium is printed on an upper surface of the base wall to facilitate a measurement of an object being positioned on the base wall. Embodiments may further include tethers and one or more bags for securing the object within the box while minimizing the risk of contamination.

There has thus been outlined, rather broadly, the more important features of the disclosure in order that the detailed description thereof that follows may be better understood, and in order that the present contribution to the art may be better appreciated. There are additional features of the disclosure that will be described hereinafter, and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 8 is a front view of an embodiment of the disclosure.

DETAILED DESCRIPTION OF THE INVENTION

Figure 1:
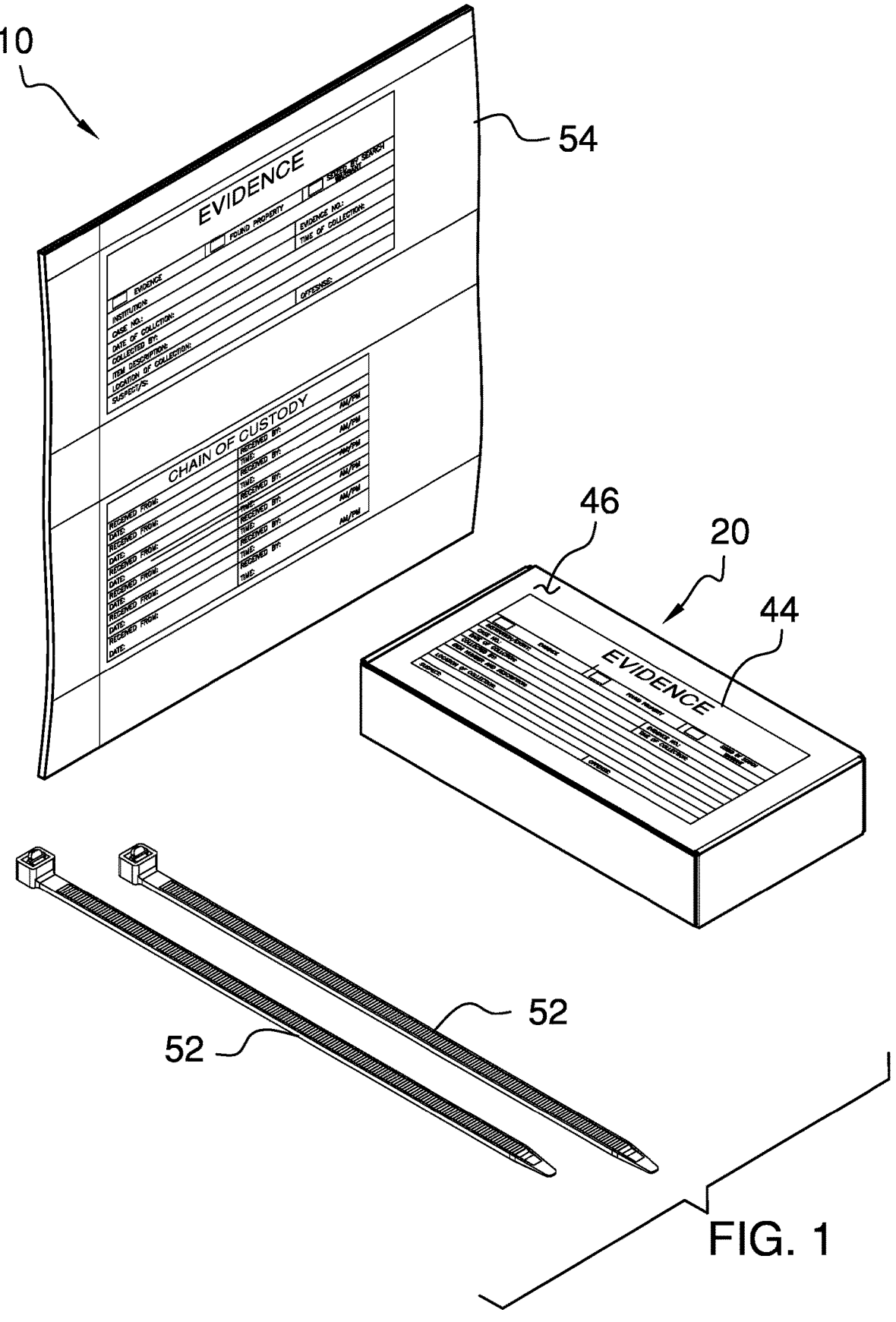
FIG. 1 is an isometric view of an evidence storage system according to an embodiment of the disclosure.
Figure 2:
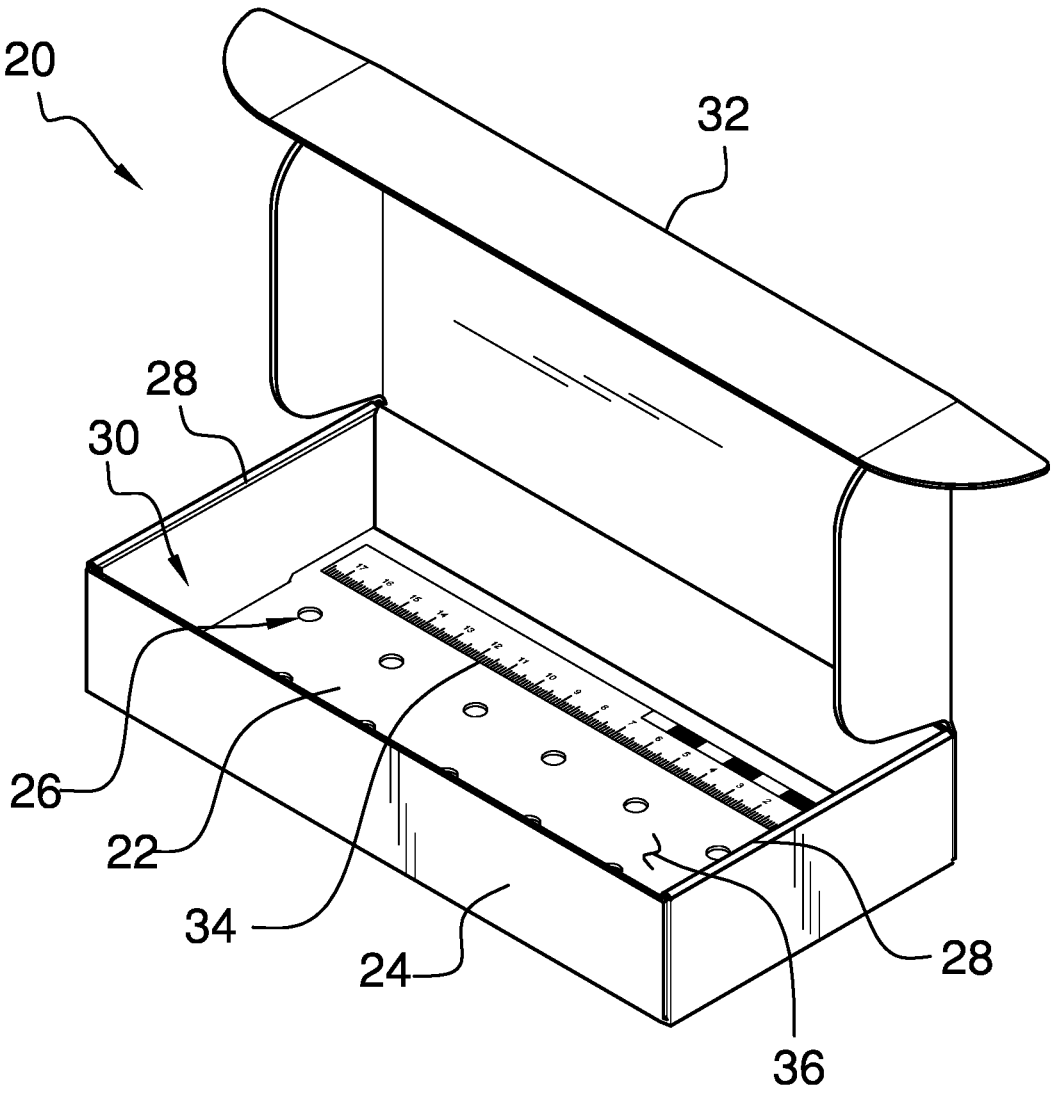
FIG. 2 is an isometric view of an embodiment of the disclosure.

With reference now to the drawings, and in particular to FIGS. 1 through 9 thereof, a new evidence storage container embodying the principles and concepts of an embodiment of the disclosure and generally designated by the reference numeral 10 will be described.

Figure 3:
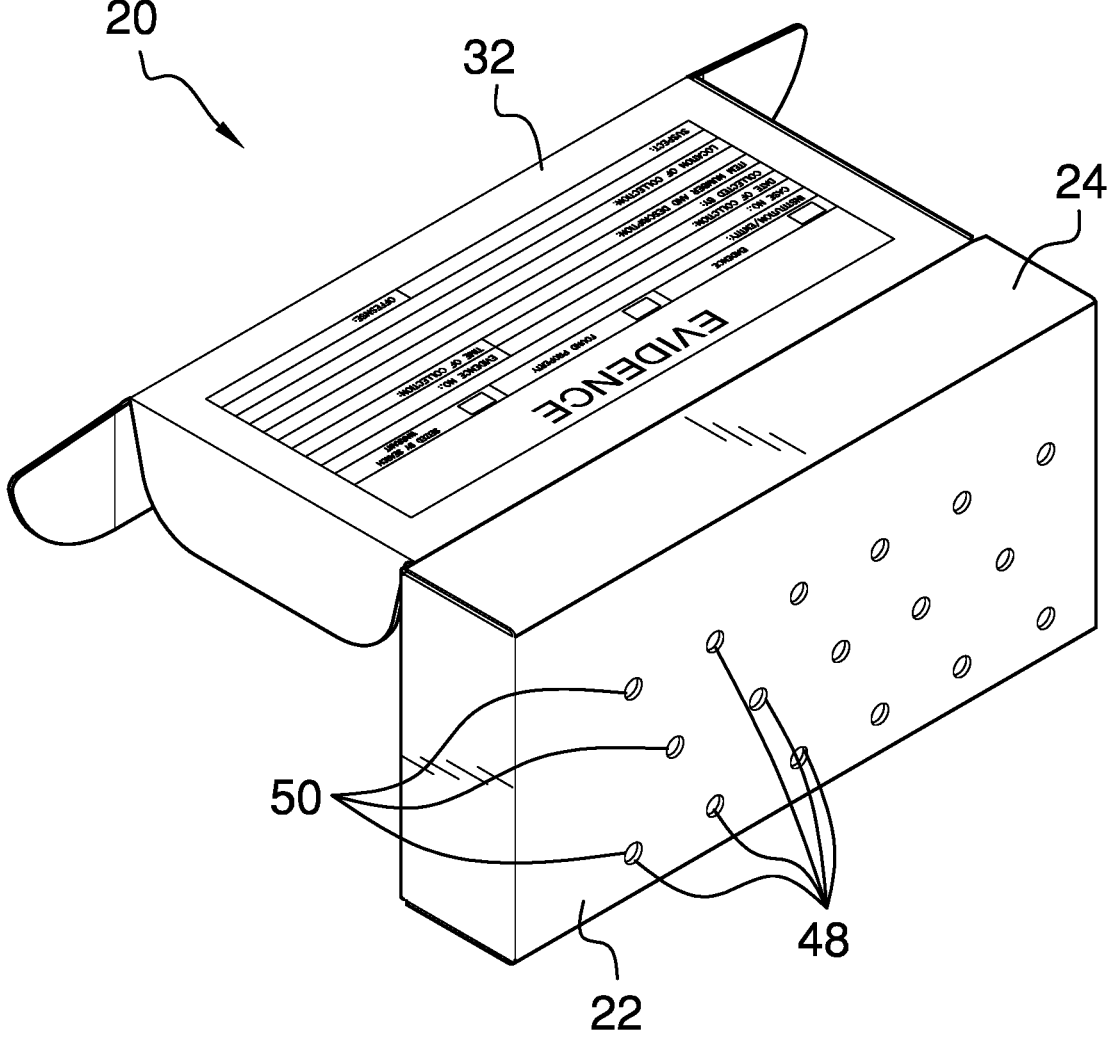
FIG. 3 is an isometric view of an embodiment of the disclosure.
Figure 4:
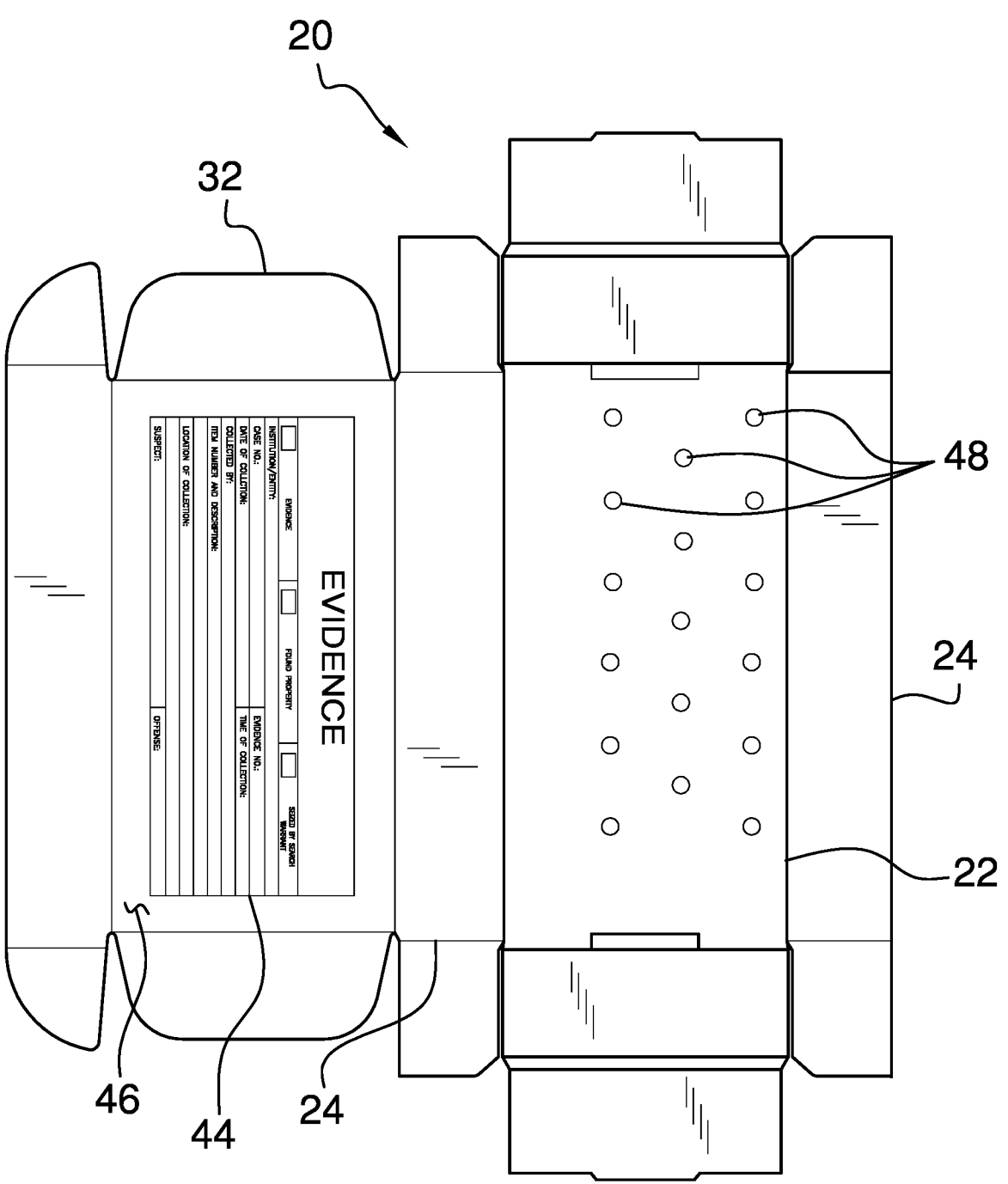
FIG. 4 is a front view of an embodiment of the disclosure.
Figure 5:
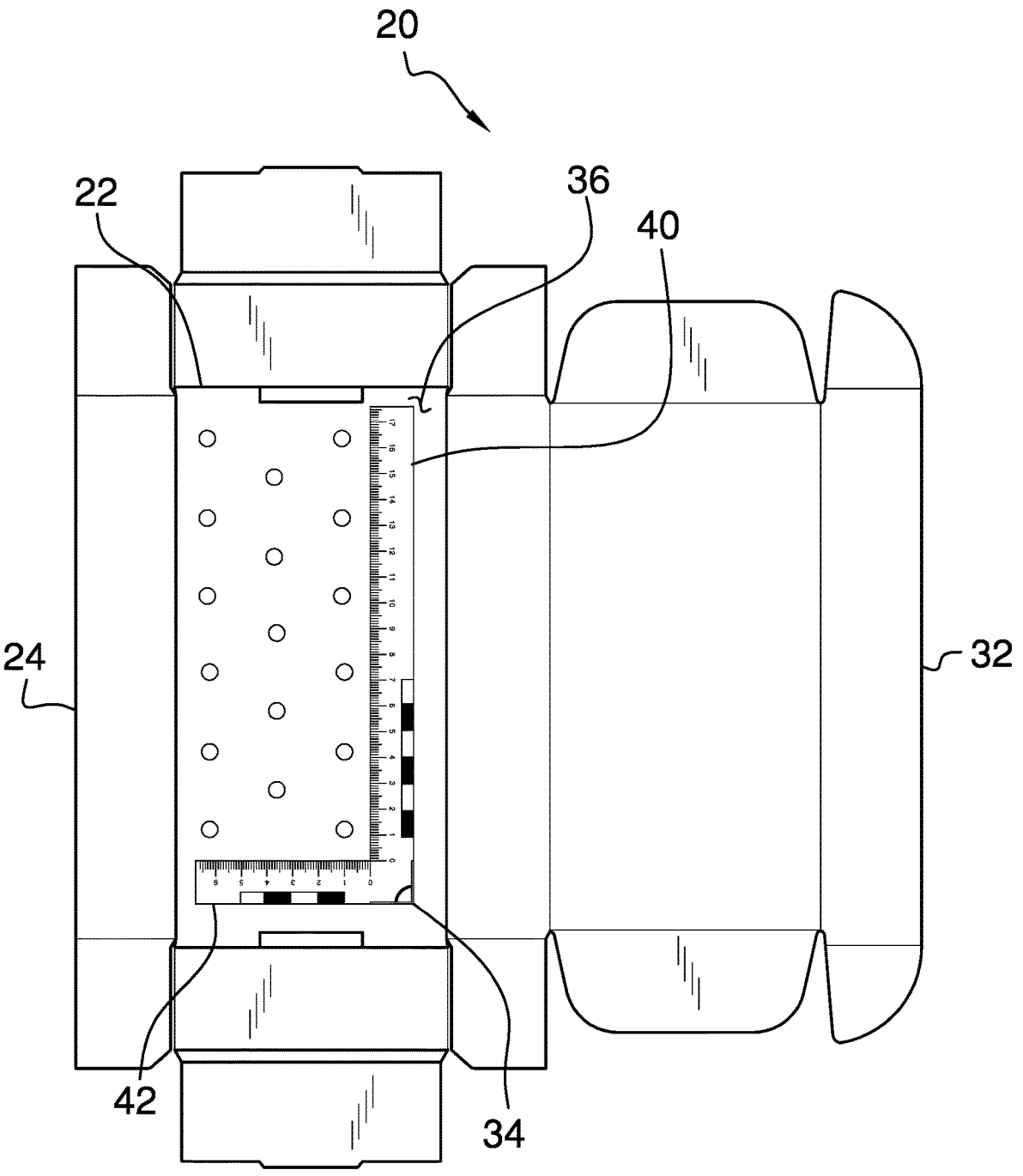
FIG. 5 is a back view of an embodiment of the disclosure.
Figure 6:
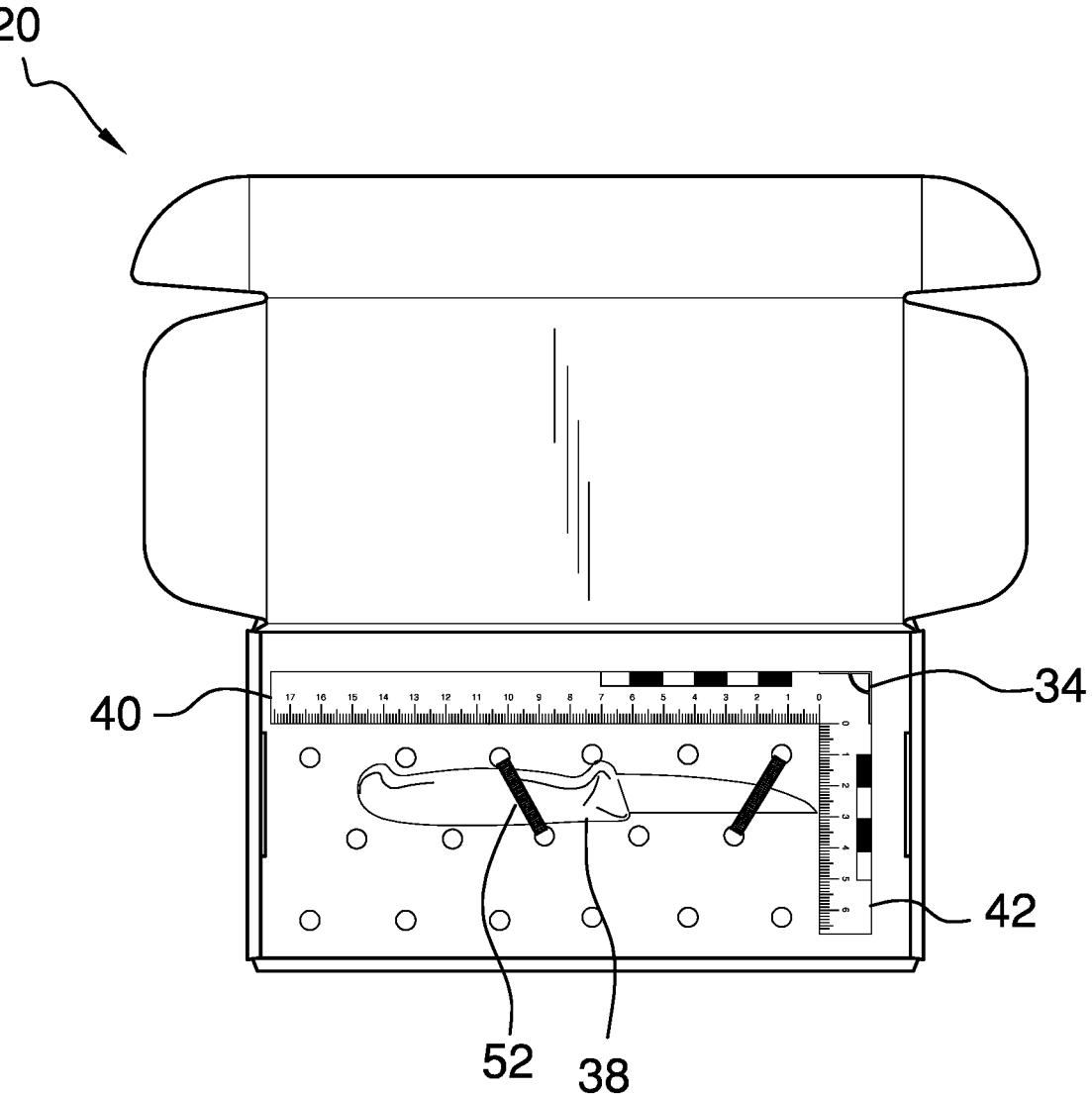
FIG. 6 is a top view of an embodiment of the disclosure.
Figure 7:
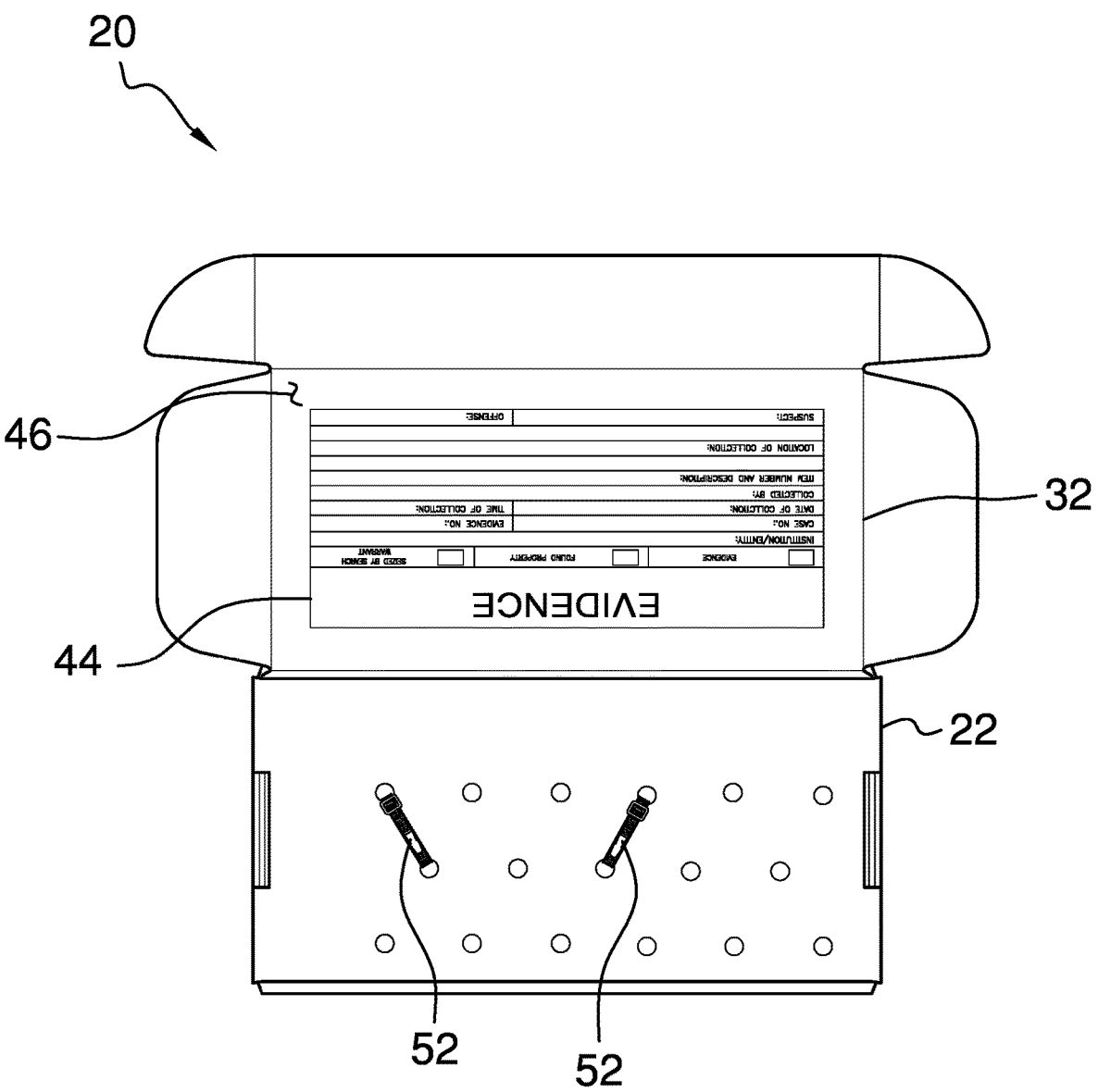
FIG. 7 is a bottom view of an embodiment of the disclosure.

As best illustrated in FIGS. 1 through 9, the evidence storage system 10 generally comprises a box 20 having a base wall 22 and a peripheral wall 24. The peripheral wall 24 is attached to and extends upwardly from the base wall 22. The peripheral wall 24 bounds an interior area 26 of the box 20. The peripheral wall 24 has an upper edge 28 defining an opening 30 into the interior area 26. In some embodiments the box 20 may be collapsible, as shown in FIGS. 4 and 5. For example, the box 20 may be collapsible to facilitate storage of the box 20 when the box 20 is not being used. The box 20 may also be collapsible to reduce the risk that the box 20 will be contaminated before use, for example because the collapsed box 20 may be stored in a plastic sleeve or be otherwise packaged to prevent contamination.

A lid 32 may be positioned on the box 20, for example abutting the upper edge 36 to selectively close the opening 30. In some embodiments, the lid 32 may be pivotally coupled to the peripheral wall 24. In other embodiments, the lid 32 may be removable from the box 20, forming a separate piece that can is positionable over the upper edge 36 to selectively close the opening 30. In other embodiments, the lid 32 may be slidably coupled to the peripheral wall 24 or may be otherwise couplable to the box 20. The lid 32 helps prevent contamination of the interior area 26 when the opening 30 is closed.

A ruler indicium 34 is printed on an upper surface 36 of the base wall 22 to facilitate a measurement of an object 38 that is positioned on the base wall 22. The ruler indicium 34 may be positioned in the interior area 26 adjacent to the peripheral wall 24. In some embodiments, the ruler indicium 34 is L-shaped, wherein the ruler indicium 34 has a length dimension 40 and a width dimension 42. The length dimension 40 measures a length along the upper surface 36 and the width dimension 42 measures a width along the upper surface 36. In other embodiments, the ruler indicium 34 may be U-shaped, providing either two length dimensions 40 and a single width dimension 42 or a single length dimension 40 and two width dimensions 42. In other embodiments, the ruler indicium 34 may only provide one of the length dimension 40 and the width dimension 42, for example by comprising a straight line. The ruler indicium 34 may provide the length 40 or width 42 dimensions in any appropriate units, including inches, feet, millimeters, centimeters, or combinations thereof.

A box label 44 may be affixed to the lid 32. The box label 44 may be positioned on an exterior surface 46 of the lid 32. The exterior surface 46 is generally opposite the lid 32 from the interior area 26 when the lid 32 is positioned to close the opening 30. The box label 44 may provide information about the object 38 being stored within the box 20. For example, the box label 44 may include a plurality of prompts, such as an institution name, a means of collection indicator, an evidence number, a case number, a time of collection, a date of collection, an identification of a user, an item description, a location of collection, an identification of a suspect, an identification of an offense, or a chain of custody log. In some embodiments, more than one box label 44 may be positioned on an exterior surface of the box 20. For example, one box label 44 may be positioned on the lid 32 while a second box label 44 is positioned on the peripheral wall 24 or the base wall 22.

Figure 9:
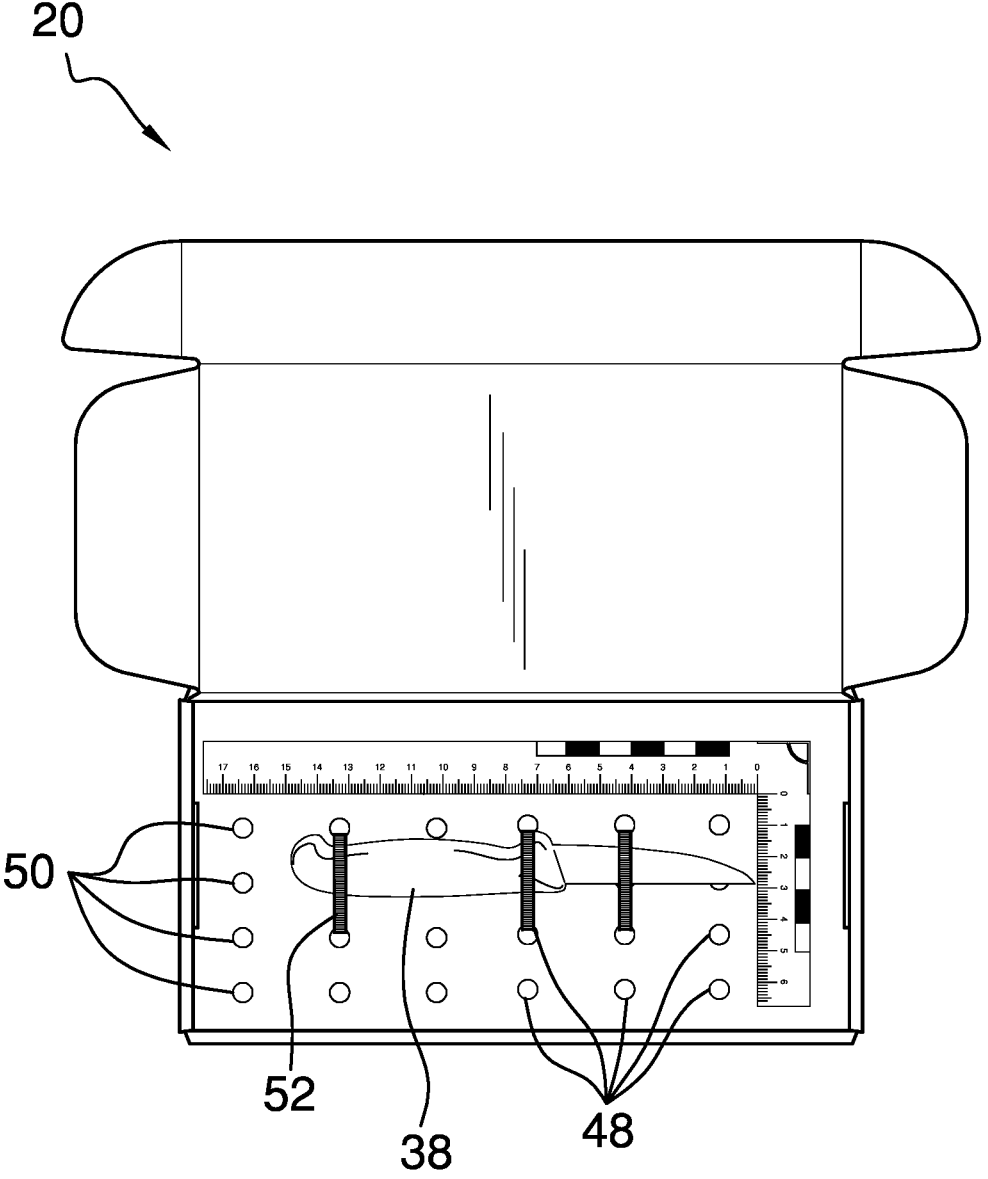
FIG. 9 is a top view of an embodiment of the disclosure.

The base wall 22 generally has a plurality of apertures 48 extending therethrough. The plurality of apertures 48 may be spaced from one another, forming a plurality of rows of apertures 50. In some embodiments, the plurality of rows of apertures 50 may be offset from one another, wherein a one of the plurality of rows of apertures 50 is offset with an adjacent next one of the plurality of rows of apertures 50. For example, as shown in FIG. 3, the first one of the plurality of rows of apertures 50 may comprise six apertures and the next one of the plurality of rows of apertures 50 may comprise five apertures that are formed between the six apertures of the first row. In other embodiments, the plurality of rows of apertures 50 may be aligned with one another, wherein a one of the plurality of rows of apertures 50 is aligned with an adjacent next one of the plurality of rows of apertures 50. For example, as shown in FIG. 9, each of the plurality of rows of apertures 50 may comprise an equal number of apertures that are aligned in identical rows and columns across the base wall 22.

The evidence storage system 10 may further include a tether 52 that is extendable through one or more of the plurality of apertures 48 to secure the object 38 to the base wall 22. For example, the tether 52 may comprise a zip tie, a twist tie, a length of string, a length of yarn, or another appropriate material.

The evidence storage system 10 may further include one or more bags 54 for holding the object 38. The one or more bags 54 may be used in conjunction with the box 20, or separately from the box 20. For example, the box 20 may be placed within one of the one or more bags 54 to reduce contamination of the object 38 within the box 20. Thus, in some embodiments, the box label 44 may be printed or affixed on the one or more bags 54 to provide relevant information about the object 38 when the box 20 is positioned within the bag 54. Alternatively, the object 38 may be placed within one of the one or more bags 54 before securing the bagged object 38 to the base wall 22. The one or more bags 54 may be sealed by the tether 52 or by other means. For example, the one or more bags 54 may have an adhesive, a coupler, or a fastener that is integrated with the bag for selectively closing the bag 54.

In use, the user can place the object 38 in the box 20 and obtain a measurement of the object 38 using the ruler indicum 34. The user can secure the object 38 to the box 20 using the tether 52. The user can label the box 20 using the box label 44 to indicate, for example, where the object 38 was found, who found the object, or other relevant information. The user can then place the box 20 within one of the bags 54 to minimize the risk that the object 38 will be contaminated.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. An evidence storage system comprising:
   a box having a base wall and a peripheral wall, the peripheral wall being attached to and extending upwardly from the base wall, the peripheral wall bounding an interior area of the box, the peripheral wall having an upper edge defining an opening into the interior area;
   a lid being positioned on the box and abutting the upper edge to selectively close the opening; and
   a ruler indicium being printed on an upper surface of the base wall to facilitate a measurement of an object being positioned on the base wall, the ruler indicium having an L-shape wherein the ruler indicium has a length dimension and a width dimension, the length dimension measuring a length along the upper surface, the width dimension measuring a width along the upper surface, the ruler indicium having a measurement scale configured for facing toward the object wherein the ruler indicium is configured to measure a length and a width of the object while the ruler is positioned between the peripheral wall and the object.

2. The evidence storage system of claim 1, wherein the box is collapsible.

3. The evidence storage system of claim 1, wherein the lid is pivotably coupled to the peripheral wall.

4. The evidence storage system of claim 1, wherein the ruler indicium is positioned in the interior area adjacent to the peripheral wall.

5. The evidence storage system of claim 1, further comprising a box label being affixed to the lid, the box label being positioned on an exterior surface of the lid.

6. The evidence storage system of claim 1, the base wall further comprising a plurality of apertures extending therethrough, the plurality of apertures being spaced from one another.

7. The evidence storage system of claim 6, wherein the plurality of apertures form a plurality of rows of apertures.

8. The evidence storage system of claim 7, wherein a one of the plurality of rows of apertures is offset from a next one of the plurality of rows of apertures.

9. The evidence storage system of claim 7, wherein a one of the plurality of rows of apertures is aligned with a next one of the plurality of rows of apertures.

10. The evidence storage system of claim 6, further comprising a tether being extendable through one or more of the plurality of apertures to secure the object to the base wall.

11. The evidence storage system of claim 10, wherein the tether comprises a zip tie.

12. The evidence storage system of claim 1, further comprising one or more bags for holding the object.

13. An evidence storage system comprising:

a box having a base wall and a peripheral wall, the peripheral wall being attached to and extending upwardly from the base wall, the peripheral wall bounding an interior area of the box, the peripheral wall having an upper edge defining an opening into the interior area;

a lid being positioned on the box and abutting the upper edge to selectively close the opening, the lid being pivotably coupled to the peripheral wall;

a ruler indicium being printed on an upper surface of the base wall to facilitate a measurement of an object being positioned on the base wall, the ruler indicium being positioned in the interior area adjacent to the peripheral wall, wherein the ruler indicium has a length dimension and a width dimension, the length dimension measuring a length along the upper surface, the width dimension measuring a width along the upper surface, the ruler indicium having a measurement scale configured for facing toward the object wherein the ruler indicium is configured to measure a length and a width of the object while the ruler is positioned between the peripheral wall and the object;

a box label being affixed to the lid, the box label being positioned on an exterior surface of the lid;

the base wall having a plurality of apertures extending therethrough, the plurality of apertures being spaced from one another;

a tether being extendable through one or more of the plurality of apertures to secure the object to the base wall; and one or more bags for holding the object.

* * * * *